Nov. 1, 1960 G. Q. McCOLL 2,958,728

DIPLEX TELEGRAPH SYNCHRONIZATION SYSTEM

Filed Aug. 17, 1959 2 Sheets-Sheet 1

INVENTOR.
GEORGE QUENTIN McCOLL
BY Edward D. Phinney
ATTORNEY

Nov. 1, 1960 G. Q. McCOLL 2,958,728

DIPLEX TELEGRAPH SYNCHRONIZATION SYSTEM

Filed Aug. 17, 1959 2 Sheets-Sheet 2

INVENTOR.
GEORGE QUENTIN McCOLL

BY Edward D. O'Kinney

ATTORNEY 2,958,728
Patented Nov. 1, 1960

2,958,728

DIPLEX TELEGRAPH SYNCHRONIZATION SYSTEM

George Q. McColl, Brooklyn, N.Y., assignor to All America Cables and Radio, Incorporated Filed Aug. 17, 1959, Ser. No. 834,207
9 Claims. (Cl. 178—61)

This invention relates to telegraph systems, and more particularly to systems for transmitting separate messages by multiplex frequency shift methods.

A principal object of the invention is to provide an improved method and apparatus for receiving distinctive signal elements such as mark and space telegraph signals from two separate sources, and transmitting them by what may be termed composite simultaneous multiplex over a multifrequency multiplex channel, such for example as a frequency shift radio channel and the like.

Another object is to provide an improved system for enabling two separate 2-element signal sources to be connected to a 4-element transmission channel, for example a carrier frequency shift radio channel, and compositing the several signal elements from the two sources in such a way that the occurrence of the composite signal elements from the two sources arrive at the transmission channel in proper timed coincidence.

A further object is to provide a novel method and apparatus for controlling a frequency shift radio transmitter of the kind arranged to transmit four distinct frequency shifts of a radio carrier, under control of mark and space signals from a pair of telegraph signal sources, and using the telegraph signals from one source as a master to derive precisely timed sampling pulses for the signals from the other source, whereby the signals from both sources are combined or composited in proper timed coincidence for appropriate control of the frequency shift transmitter.

A further feature is to provide novel organization, arrangement and relative interconnection of parts which, by their conjoined action, provide an improved frequency shift telegraph transmission and receiving system.

Other features and advantages will appear from the ensuing descriptions and the appended claims.

Figures 1, 3:
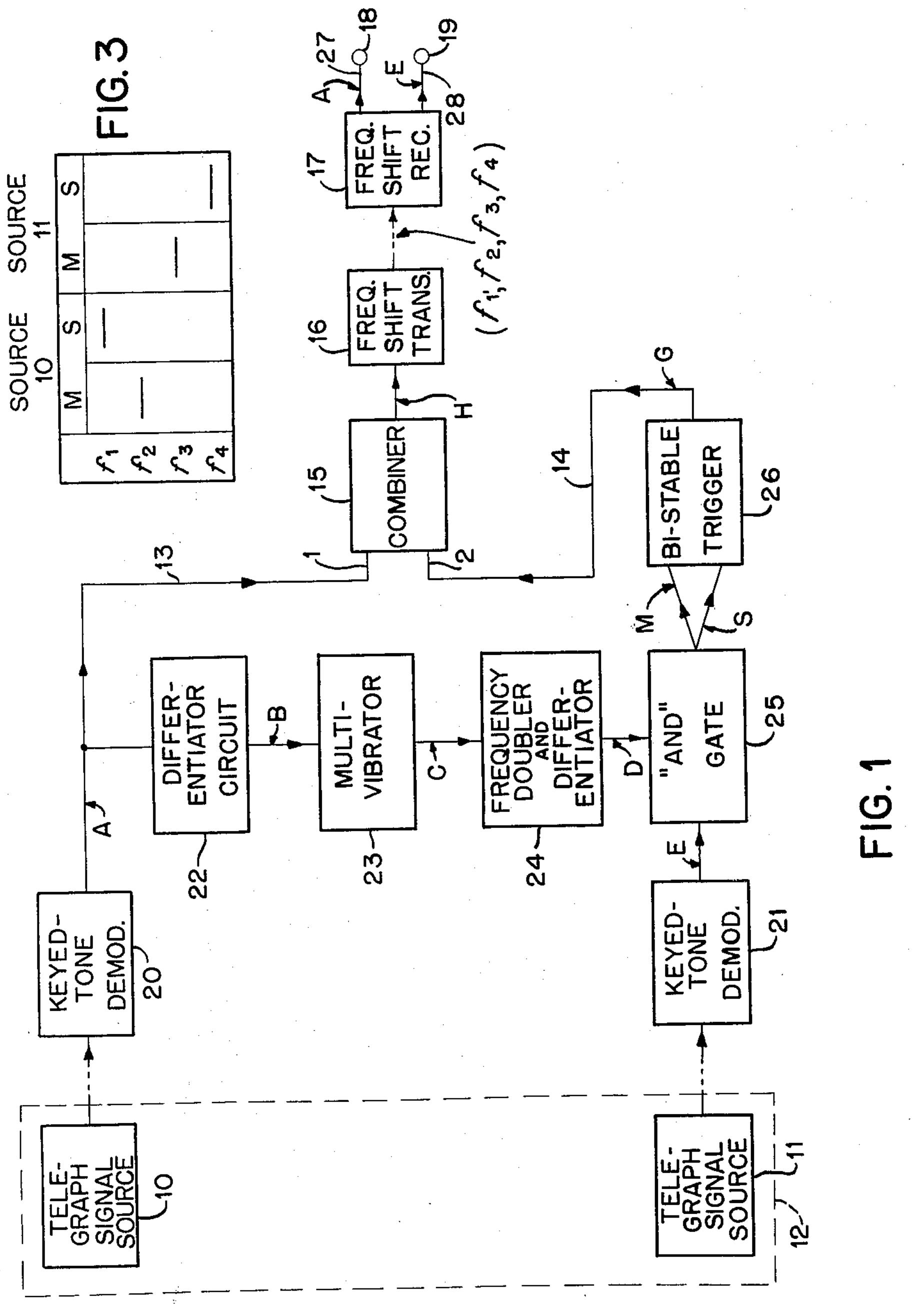
Fig. 1 is a schematic block diagram of a telegraph system embodying the invention.
Fig. 3 is a chart showing the correlation between the mark and space signal elements and the frequency of the transmitted carrier.

The invention is in the nature of an improvement on the general kind of frequency shift signaling system disclosed in U.S. Patent 2,650,266 to S. D. Browning, the disclosure of which patent is hereby incorporated herein by reference. The more essential parts of such a system are illustrated in Fig. 1 of the drawing herein, by means of suitably legended blocks. For example, the block 10 represents any well known source of mark and space telegraph signals, which source may take the form, for example, of a start-stop telegraph machine which translates the message into respective mark and space signals in the well known permuted signal element form. The invention is not limited to any particular means for generating the mark and space signals, it being understood that each of the signal elements, whether mark or space, is of substantially the same duration as the remaining signal elements. A similar source 11 is also provided and both sources 10 and 11 may be located at a central office represented by the dotted block 12. The mark and space signals from sources 10 and 11 are applied to suitable lines 13 and 14 leading through a combiner circuit 15 to a frequency shift transmitter 16, the details of which are explained in said U.S. Patent 2,650,266. In general, the transmitter 16 is of the kind which is capable of producing an output radio carrier which can be shifted to four different frequencies $f1$, $f2$, $f3$, $f4$, each frequency representing a corresponding signal element from the sources 10 and 11, as indicated in the chart of Fig. 3.

The signals from transmitter 16 are received in a corresponding frequency shift receiving arrangement represented by block 17, where they are decombined and translated into corresponding mark and space signals for operating telegraph signal reproducers 18, 19 such as telegraph printers and the like.

In order that such a system shall be reliable and accurate under variable operating conditions, it is necessary that the signals from the sources 10 and 11 arrive at the input of the combiner 15 in precise timed coincidence. Any condition which disturbs such coincidence may result in so-called "splits" and "fills" in the signals recorded at the units 18, 19. For example, if the sources 10 and 11 use well known rotary distributors, any accidental variation of the shaft orientation of one distributor with respect to the other, will disturb the desired coincidence at the combiner 15. Likewise, if the signals are transmitted over the lines, 13, 14 by well known tone-keying techniques, dissimilarities in the two lines or in the tone-keying equipment, or any other condition which disturbs the proper time phase relation of the signals over the lines 13 and 14, will disturb the desired coincidence at the input to the combiner 15.

Figure 2:
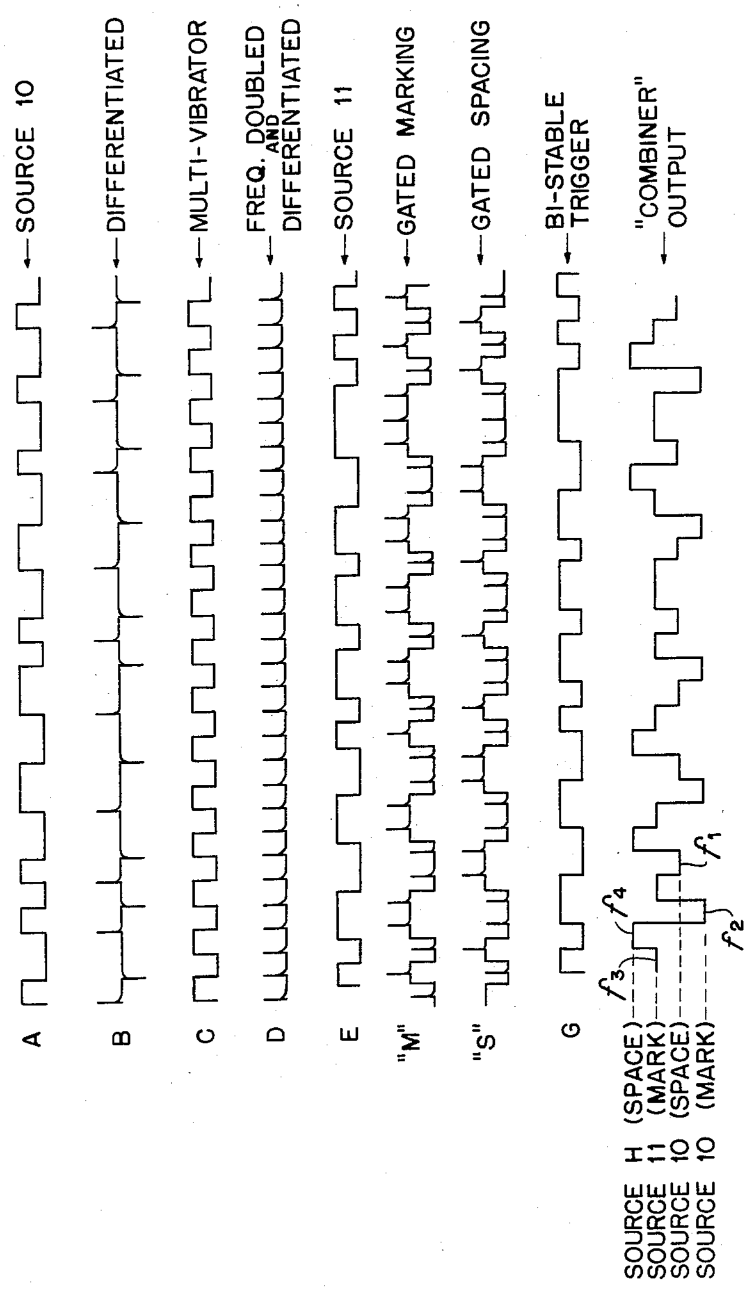
Fig. 2 shows a series of wave forms of correlated signal elements and control pulses used in explaining the invention.

In order to overcome the above noted and other disadvantages, the keying transitions of the signals from one source, for example source 10, are used as a master control to control the gating of the signals from the other source prior to applying them to the combiner 15. Thus, as shown in Fig. 1, the mark and space signals from source 10 may be transmitted as respective audio tone frequencies from the central station and are applied to the tone demodulator 20 of any well known kind. The output of demodulator 20 produces the mark and space signals for example as represented by the wave form A (Fig. 2). These wave forms A are also applied to the No. 1 input of the combiner 15.

Likewise the tone signals from the second source are demodulated in a similar tone demodulator 21 to produce at the output thereof the corresponding mark and space signals represented by the wave form E (Fig. 2). However, the wave forms E, instead of being applied directly to the No. 2 input of the combiner 15, are gated on or applied at a definite precisely timed instant with respect to the signal elements of wave form A (Fig. 2). For that purpose a portion of the signals on line 13 of wave form A are applied to the input of any well known signal differentiating circuit 22 which translates the transitions of each of the signal elements into corresponding positive and negative pulses as represented by the wave form form B (Fig. 2). These differentiating pulses are then applied to a symmetrical multivibrator 23 of any well known type, whose pulse recurrence frequency corresponds to the keying frequency of the transmission, and which is locked at that frequency by the pulses from circuit 22.

The multivibrator output signals are represented by the wave form C (Fig. 2), and these multivibrator signals are applied to any well known frequency doubling and differentiating network 24 for producing a positive pulse for each transition of the multivibrator pulse. The wave form of the pulses at the output of the doubling and differentiating network 24 are presented by the wave form D (Fig. 2).

The pulses D and the pulses E (Fig. 2) are applied to respective inputs of an "and" gate circuit 25. When the pulses D coincide with a marking element of the wave form E, the output of the "and" gate represents a marking signal, the wave forms of which are illustrated in wave form M (Fig. 2). On the other hand, when the pulses D coincide with a spacing element of the wave form E, a spacing signal output is produced as represented by the wave form S (Fig. 2). The mark and space outputs from the gate 25 control any well known form of bi-stable trigger circuit 26 which produces a wave form output G (Fig. 2). The net result is that the initiation and termination of each mark or space signal element from the trigger circuit 26 will coincide with the keying transitions of the signal elements from the source 10 which appear on line 13. The net result is that there is applied to the input of the combiner 15 a composite form illustrated by the wave form H of Fig. 2, from which it will be seen that the initiation and termination of each marking or spacing element from the device 26 will coincide with the keying transitions of the signal elements from source 10 as applied to line 13.

An examination of the composite or combined wave form H will show that for any given signal time unit there are four discrete conditions designated F1, F2, F3, F4. By means of a suitable combining network 15 described in detail in said Patent 2,650,266, these four conditions can be translated into four separate voltage conditions, for example as follows: $F1=+15$ volts; $F2=+5$ volts; $F3=-15$ volts; $F4=-5$ volts. Those four voltage conditions at the output of device 15 can then be used to shift the frequency of the carrier from shifter 16 to the four different carrier frequencies $f1$, $f2$, $f3$, $f4$. At the receiver 17 these four frequencies are separated into respective channels, and as described in said U.S. Patent 2,650,266, the frequencies $f1$, $f2$ produce on the line 27 respective mark and space elements for operating the reproducer 18; and the frequencies $f3$, $f4$ produce on the line 28 mark and space elements for operating the reproducer 19. Therefore, the mark and space signals from source 10 are applied only to the device 18; while the mark and space signals from source 11 are applied only to device 19. For a detailed description of the manner in which the combined signal from device 15 is used to operate the respective reproducers 18 and 19, reference may be had to said U.S. Patent 2,650,266.

Various changes and modifications within the scope of the invention may be made as will be apparent to those skilled in the art.

What is claimed is:

1. Telegraph apparatus comprising means to set up signal voltages representing mark and space conditions in two discrete mark and space telegraph channels, means to combine said voltages to set up four different control voltages representing the four possible combinations of space and mark from said two channels, means to synchronize the mark and space conditions in both channels, the last mentioned means including means to derive from the transitions between signal elements in one channel, sampling pulses for the mark and space signal elements of the other channel, and means to apply the signals from said other channel to said combining means under control of said sampling pulses.

2. Telegraph apparatus according to claim 1 in which a mark-to-space trigger means is connected ahead of said combining means, and means to operate said trigger means under control of said sampling pulses.

3. Telegraph apparatus according to claim 2 in which said trigger means is of the bi-stable kind.

4. A telegraph transmitter of the kind wherein a carrier is arranged to be shifted in frequency to any one of four predetermined frequencies, two of said frequencies representing respectively mark and space signal elements from one signal source, and the remaining two frequencies representing respectively mark and space signal elements from a second source, a signal element combiner for producing at its output four control voltages correlated respectively with said four frequencies, means to apply the mark and space signal elements from the first of said channels to the input of said combiner, means to apply the mark and space signal elements from the second source also to the input of said combiner, means to derive from the mark and space signal elements from the first source sampling pulses correlated with the transitions between said mark and space elements from the first source, and means to control the application to said combiner of the mark and space signal elements from the second source under control of said sampling pulses.

5. A telegraph transmitter according to claim 4, in which the means to derive said sampling pulses includes at least one differentiating device for producing differentiated pulses correlated in time with the mark and space transitions of the signal elements from the first source.

6. A telegraph transmitter according to claim 4 in which the means for controlling the application of the signal elements from the second source to said combiner includes a coincidence gate which is jointly controlled by the said sampling pulses and by the mark and space signal elements from said second source.

7. A telegraph system of the kind wherein the mark and space telegraph signal elements from two separate sources are transmitted and received as a frequency shifted carrier, comprising in combination, means to combine the signal elements from both sources to produce a respective set of voltages for controlling a corresponding frequency shift of the carrier, means to apply the signal elements from one source substantially directly to said combining means, means to derive from the signals from said one source a corresponding series of timing pulses which are synchronized with the transition between signal elements from said first source, coincidence gating means having a pair of inputs, means to apply the signal elements from the second source to one of said inputs, means to apply the said timing pulses to the other of said inputs to produce in the output of said gating means respective keyed mark and space signals, a bi-stable trigger circuit device controlled by the said keyed signals, and means connecting the output of said trigger device to the input of said combining means together with the signal elements from said first source.

8. A telegraph system according to claim 7 in which each signal from one of said sources comprises the same number of signal elements with all the signal elements of substantially the same duration.

9. A telegraph system according to claim 7 in which a frequency shift receiver is connected to receive said frequency shifted carrier, a pair of telegraph signal reproducers connected to the output of said receiver and including means to operate one reproducer under control of the signal elements from said first source and the other reproducer under control of the signal elements from the other of said sources.

No references cited.